(12) United States Patent  
Backer (10) Patent No.: US 10,644,894 B2  
(45) Date of Patent: May 5, 2020

(54) SYSTEMS AND METHODS FOR VIRTUAL INTERACTIONS

(71) Applicant: Alejandro Backer, Altadena, CA (US)

(72) Inventor: Alejandro Backer, Altadena, CA (US)

(*) Notice: Subject to any disclaimer, the term of this patent is extended or adjusted under 35 U.S.C. 154(b) by 33 days.

(21) Appl. No.: 15/792,645

(22) Filed: Oct. 24, 2017

(65) Prior Publication Data

US 2018/0102912 A1    Apr. 12, 2018

Related U.S. Application Data

(63) Continuation of application No. 14/577,685, filed on Dec. 19, 2014, now Pat. No. 9,838,208, which is a (Continued)

(51) Int. Cl.

| | |
|---|---|
| *G06F 15/16* | (2006.01) |
| *H04L 12/18* | (2006.01) |
| *H04L 29/06* | (2006.01) |
| *H04N 21/4788* | (2011.01) |
| *H04L 12/58* | (2006.01) |
| *H04N 21/25* | (2011.01) |
| *H04N 21/258* | (2011.01) |
| *H04N 21/2743* | (2011.01) |
| *H04N 21/433* | (2011.01) |
| *H04N 21/475* | (2011.01) |

(Continued)

(52) U.S. Cl.
CPC ........ *H04L 12/1822* (2013.01); *G06F 3/0481* (2013.01); *H04L 29/06476* (2013.01); *H04L 51/32* (2013.01); *H04L 65/403* (2013.01); *H04L 65/4015* (2013.01); *H04L 65/4061* (2013.01); *H04L 65/4084* (2013.01); *H04L 65/60* (2013.01); *H04N 21/242* (2013.01); *H04N 21/251* (2013.01); *H04N 21/25891* (2013.01); *H04N 21/2743* (2013.01); *H04N 21/4334* (2013.01); *H04N 21/4756* (2013.01); *H04N 21/4788* (2013.01); *H04N 21/6125* (2013.01); *H04N 21/6175* (2013.01); *H04L 29/06027* (2013.01); *H04N 7/15* (2013.01); *H04N 21/4223* (2013.01); *H04N 21/42203* (2013.01); *H04N 21/4753* (2013.01); *H04N 21/485* (2013.01)

(58) Field of Classification Search
CPC . H04L 12/1822; H04L 65/60; H04L 65/4084; H04L 65/403; H04L 65/4015
USPC .......................................................... 709/204
See application file for complete search history.

(56) References Cited

U.S. PATENT DOCUMENTS

| | | | |
|---|---|---|---|
| 8,010,985 B2* | 8/2011 | McKinley | .......... H04N 7/17336 725/86 |
| 8,019,815 B2* | 9/2011 | Keener, Jr. | ................ H04N 7/15 709/204 |

(Continued)

OTHER PUBLICATIONS

Final Office Action for U.S. Appl. No. 14/577,685, filed Dec. 19, 2014 on behalf of Alex Backer, dated Apr. 19, 2017. 6 Pages (Continued)

*Primary Examiner* — Krisna Lim (74) *Attorney, Agent, or Firm* — Steinfl + Bruno, LLP (57) ABSTRACT

Systems and methods for virtual interactions are described. One or more users can view or listen to media, react to the media and share such media experience virtually with others. The media experience can take place synchronously, asynchronously or both.

4 Claims, 7 Drawing Sheets

Related U.S. Application Data continuation of application No. 13/475,884, filed on May 18, 2012, now Pat. No. 8,949,333.

(60) Provisional application No. 61/488,584, filed on May 20, 2011.

(51) Int. Cl.
*H04N 21/61* (2011.01)
*H04N 21/242* (2011.01)
*G06F 3/0481* (2013.01)
*H04N 7/15* (2006.01)
*H04N 21/422* (2011.01)
*H04N 21/4223* (2011.01)
*H04N 21/485* (2011.01)

(56) References Cited

U.S. PATENT DOCUMENTS

| | | | | |
|---|---|---|---|---|
| 8,121,277 B2* | 2/2012 | Baird | ............... | H04L 12/1831 |
| | | | | 370/260 |
| 8,284,233 B2* | 10/2012 | Bennett | ............... | H04L 12/1822 |
| | | | | 348/14.08 |
| 9,838,208 B2 | 12/2017 | Backer | | |
| 2006/0087987 A1* | 4/2006 | Witt | ............... | H03M 7/30 |
| | | | | 370/260 |
| 2007/0195159 A1* | 8/2007 | Packer | ............... | H04N 7/147 |
| | | | | 348/14.12 |
| 2008/0068446 A1* | 3/2008 | Barkley | ............... | H04N 7/147 |
| | | | | 348/14.07 |
| 2010/0201780 A1* | 8/2010 | Bennett | ............... | H04L 12/1822 |
| | | | | 348/14.12 |
| 2012/0066722 A1* | 3/2012 | Cheung | ............... | H04M 1/7253 |
| | | | | 725/62 |
| 2012/0296972 A1 | 11/2012 | Backer | | |
| 2015/0106720 A1 | 4/2015 | Backer | | |

OTHER PUBLICATIONS

Non-Final Office Action for U.S. Appl. No. 14/577,685, filed Dec. 19, 2014 on behalf of Alex Backer, dated Sep. 7, 2016. 9 Pages.
Non-Final Office Action for U.S. Appl. No. 13/475,884, filed May 18, 2012 on behalf of Alex Backer, dated Jan. 29, 2014. 8 Pages.
Notice of Allowance for U.S. Appl. No. 13/475,884, filed May 18, 2012 on behalf of Alex Backer, dated Sep. 19. 2014. 9 Pages.
Notice of Allowance for U.S. Appl. No. 14/577,685, filed Dec. 19, 2014 on behalf of Alex Backer, dated Oct. 11, 2017. 7 Pages.

\* cited by examiner

FIG. 7 s# SYSTEMS AND METHODS FOR VIRTUAL INTERACTIONS

CROSS REFERENCE TO RELATED APPLICATIONS

The present application is a continuation of U.S. patent application Ser. No. 14/577,685 filed on Dec. 19, 2014, which is a continuation of U.S. patent application Ser. No. 13/475,884 filed on May 18, 2012, which claims priority to U.S. Provisional Patent Application No. 61/488,584, filed on May 20, 2011, all of which are incorporated herein by reference in their entirety.

FIELD

The present disclosure relates to social media. Moreover, it relates to systems and methods for virtual interactions.

BACKGROUND

Social networking has emerged as one of the most popular pastimes on the Internet, at least partly because it mimics what people do in the real world: converse, have dialogs, tickle each other's egos, and make displays to their networks. But fundamentally, the Web remains a very solitary experience. Community involvement is limited mostly to verbal comments, replies and likes.

SUMMARY

According to a first aspect, a computer-implemented method of sharing an interactive experience is described, the method comprising: providing a central server connected to a network and configured to be connected to a plurality of client computer terminals through the network, each of the plurality of client computer terminals adapted to stream a video from the network; streaming the video on the plurality of client computer terminals, the video being viewed by a first user and at least one second user, the first user and the at least one second user independently receiving streaming video on separate client computer terminals, wherein the streaming to the first user and the at least one second user occurs synchronously such that a playback timing of the streaming video occurs at the same time on all users' client computer terminals; capturing commentary of the first user and the at least one second user with a commentary capturing device, the capturing being performed while the first user and the at least one second user view the video; and playing back the commentary of the first user on the client computer terminal of the at least one second user and/or vice versa, while streaming the video.

According to a second aspect, a computer-implemented method of sharing an interactive experience is described, the method comprising: providing a central server connected to a network and configured to be connected to a plurality of client computer terminals through the network, each of the plurality of client computer terminals adapted to stream a video from the network; streaming the video to a client computer terminal of the first user of the plurality of client computer terminals, wherein the video is being viewed by the first user; capturing commentary of the first user with a commentary capturing device, the capturing being performed while the first user views the video; storing the commentary of the first user on the central server; and streaming the video to a client computer terminal of the second user, wherein the video is being viewed by the second user while simultaneously playing back the commentary of the first user on the client computer terminal of the second user, wherein the streaming by the second user occurs asynchronously from the streaming by the first user.

According to a third aspect, a computer-implemented system for sharing an interactive experience is described, the system comprising: a central server connected to a network and configured to be connected to a plurality of client computer terminals through the network, each of the plurality of client computer terminals adapted to stream a video from the network; and a commentary capturing device adapted to capture commentary of one or more users while the one or more users view the video, wherein the client computer terminals are adapted to playback the commentary of the one or more users simultaneously while streaming the video.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

DETAILED DESCRIPTION

A virtual interactive system is disclosed that enables users to share their interactive experiences with others or themselves, either simultaneously or at a later time (asynchronously). For example, two or more people can share an experience on the Internet by a combination of browsing together and viewing the same media (e.g., videos, webpages, music, pictures, etc.) at the same time, sharing control of the experience, seeing each other's facial expressions, and hearing each other's voices, laughter and/or crying.

In some embodiments, users can check who is online or press one button or key to have a software application automatically invite any group or set of people to a virtual date or activity. By way of example and not of limitation, friends can be added to the virtual date or activity by pressing a button corresponding to the friend. Thus, couples can go on a virtual date, and fans can attend a virtual viewing of a sports event. At such virtual viewing of sport events, the fans can see which friends are also in virtual attendance, as well as meet strangers who might have common interests.

In some embodiments, invitation to other users to share the interactive experience can be accomplished, for example, by sending an invitation using a variety of methods, including an automated phone call, text message, app push notification or email to invitees.

While sharing an experience (e.g., dating, event attendance, etc.) in the real world typically occurs in real-time (e.g., when people attend the same event at the same place at the same time), some embodiments of the present disclosure can allow sharing an experience asynchronously by recording and subsequently playing back the recorded experience. By way of example and not of limitation, a first user can watch a movie while using a computer, a microphone and/or a camera to record the first user's reactions to the movie or the event. When a second user wants to participate in the shared experience, either simultaneously or at a later time, the second user's reactions are recorded while he/she experiences (e.g., hears and sees) the reactions of previous participants. Each participant can choose which users to share their experience with. Furthermore, the users can specifically select which user to share the different aspects of interactive sharing. For example, the user can choose to share only voice interaction with one user but choose to share both the voice interaction and video interaction with another user.

In some embodiments, the user can choose to hear all users that are attending the virtual event (e.g., roar of the entire crowd to a virtual sporting event), but choose to only see the face of his girlfriend. Alternatively, the user can choose to hear his buddy's comments, but only faintly hear the other users as a distant, aggregate blur of cheers. According to yet another embodiment, the user can choose to only see comments by a preselected group, such as a group comprising users he has determined to be safe.

In some embodiments, asynchronous experience sharing can allow a person to share the experience with their previous self. By way of example and not of limitation, a user can say something while watching a video. Then, a friend can watch the same video at a later time and say something while watching the video. In response to the comment made by the friend, the user can then react to the previous comments and say something further, and so on. Over time, such interactions can accumulate as layers of commentary, reaction, sight, and sound.

In some embodiments, the user can be automatically notified as a new layer is added to the experience. By way of example and not of limitation, the user can be notified, and choose to experience only the new layer (e.g., just hear the new comment, reaction, etc.), or choose to re-experience the entire experience with the new layer, or any combination of layers thereof.

In some embodiments, the experience can be edited so that only the desired interactions are saved and the undesired interactions are deleted. For example, if another user makes a hurtful comment, that comment can be deleted. If a particular action is too slow, such action can be sped up.

In some embodiments, the digital shared experience can include haptic sensors and actuators to provide shared virtual touch such that the users will be able to live and relive their favorite experiences. Such experiences can include, for example, digital asynchronous sexual encounters.

In some embodiments, an audio reaction from each viewer of a media piece (e.g., video) can be recorded unless the users choose to opt out. When a viewer watches the video, the user can hear a mix of the original soundtrack and a weighted combination of the audio reactions recorded from each of the other viewers. By way of example and not of limitation, the volume of audio reactions from friends can be weighted higher than for the audio reactions from non-friends. Users can toggle any audio reactions on or off. Non-friends can be grouped so that all non-friends can be toggled on or off simultaneously. Each of the audio reactions can be rated by other users. The top rated audio reaction(s) can be sharable to all users, and not just friends, and can be labeled with a special name (e.g., star or DJ of that video). Users can record over their previous audio recording, thereby allowing the user to delete the old audio recording or combining with it the previous recording.

In some embodiments, the user can select to hear a crowd as it would sound when surrounded by a certain group of people, for example, a sports team.

In some embodiments, the media contents can be augmented by extending, expanding or enhancing the media to supplement a media viewer's experience with reactions of friends, entertainers, and others. By way of example and not of limitation, by augmenting the media, viewers can share the experience of viewing the media with friends or loved ones, or hear a roar of thousands of people as if the viewer was watching the video in a stadium full of sports fans. Therefore, the feeling of energy and companionship can be brought to every video without the constraints of time and space.

Many videos are homemade videos created as a consequence of a particular video (e.g., Lady Gaga's music video). Yet such homemade videos can be disjoined, hard to find, and virtually difficult to find the best or most relevant version. Evolution is a powerful creative mechanism. Evolution has three key ingredients: variation (generation of many variants of any given genotype), selection (to select the most fit) and heredity (to ensure that the adaptations selected for are present in progeny, or future variations). By way of example and not of limitation, existing methods of video production and distribution generate variation (each person can create their own copy of another), heredity (although difficult, it is possible to copy a video and modify it), and selection (the most liked videos are spread socially by sharing), but such mechanisms can be very inefficient. There is no simple way for a viewer to find the best "version" or "daughter" of any particular video lineage, thus selection can be very haphazard. Heredity can be poor because video-editing and sharing sites do not make it easy or even possible to modify another person's video. Online tools can be difficult to generate variations (e.g., uploading a new soundtrack, superimposing two soundtracks, inserting clips, removing clips, etc.). Furthermore, it can be nearly impossible for users at large to improve an original version of a video, which can often be the most commonly found video due to its age, which can often lead to higher number of views.

According to some embodiments of the present disclosure, by allowing viewers to rate each video and/or soundtracks, and further, allowing the viewers to enhance such video or soundtracks (e.g., not just the original video's creator), and further, by grouping various versions or modifications of any given video or media piece (e.g., song, composition), the best rated soundtrack and/or version of each video can be available to all future viewers of the digital video (e.g., as an optional soundtrack, in addition to the original soundtrack). The viewers can then combine the responses to the video with another video, aggregating them in one place, and making it easier to find the most highly rated version of any video. Such embodiments can result in an efficient digital video evolution.

Example Implementations

Figure 2:
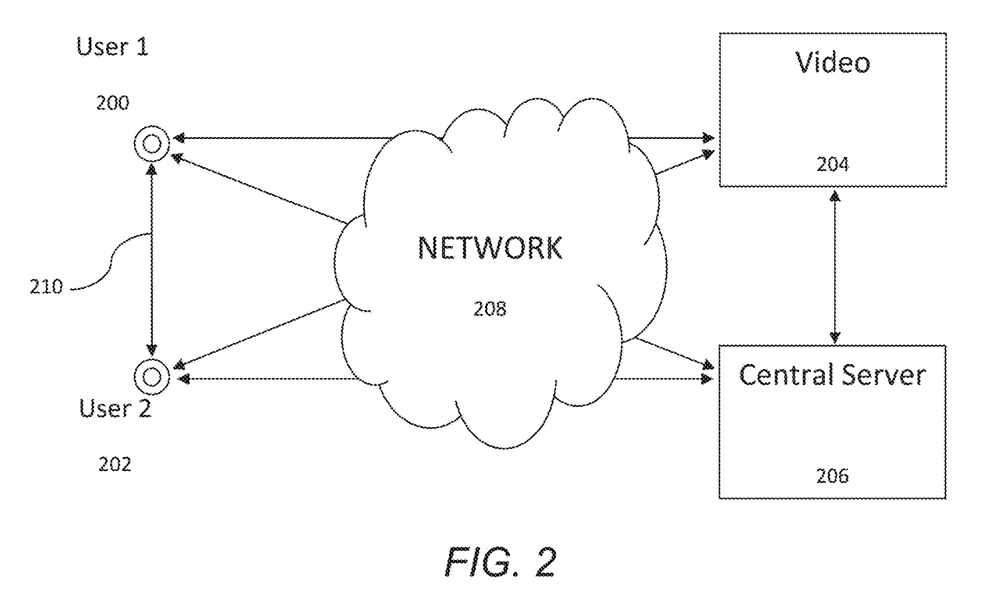
FIG. 2 shows an example block diagram of a virtual interaction system in a synchronous mode.

In some embodiments, the virtual interaction system can operate in a synchronous mode. FIG. 2 shows such example system configured to operate in synchronous mode where two or more users can simultaneously interact using a computer system (or a similar system capable of viewing media) over a network (208) (e.g., the Internet) while viewing media such as an online video or picture. By way of example and not of limitation, the media can be a video from a third party hosted website (204) (e.g., YOUTUBE®) or the video can be located on a central server (206) that is a part of the virtual interaction system. In the present example, a video viewing of a live sporting match will be used to describe the virtual interaction system of the present disclosure. However, those skilled in the art would understand that videos and/or pictures of other types can be viewed instead of a sporting match.

Figure 5:
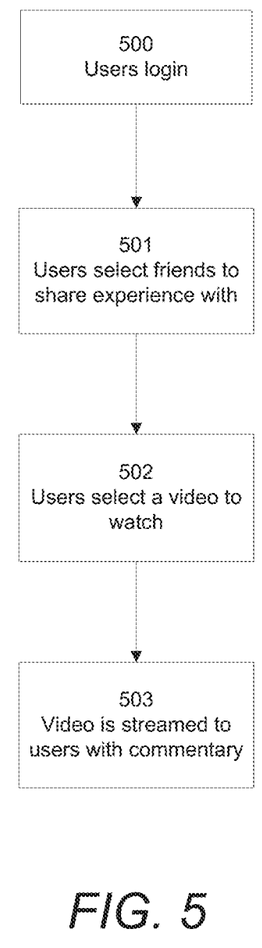
FIG. 5 shows a flow chart of a virtual interaction system operating in a synchronous mode.

Herein the present disclosure, the term "commentary" is intended to refer to, by way of example and not of limitation, reactions by the user such as, laughing, crying, yelling, speaking, jumping, etc. while watching a video on a client computer terminal. Such reactions can be recorded in the form of video, audio, or haptic and stored on a central server or shared directly with another user on their client computer terminal. FIG. 5 shows an example flow chart of the virtual interaction system operating in a synchronous mode. Initially, a first user (200) can login (500) to the virtual interaction system and access a video of the live sporting event either on the third party's website (204) or on the central server (206) through a network (208). Then, the first user (200) can select a group of friends (501) in which he desires to watch the video with. The first user and his friends can decide which video they would like to watch (502), and begin streaming the video (503).

In some embodiments, the user can create a list of friends for which the user can virtually share the act of watching the video with. According to a first method, the user can import a list of friends from an already existing online account, such as from a social network account. According to a second method, the user can create a list of friends based on people who have accounts with the virtual interaction system of the present disclosure. According to a third method, the user can create a list of friends based on a class of friends. In other words, each user of the virtual interaction system can be associated with one or more categories of classes (e.g., fans of Argentinian soccer, fans of American baseball, etc.) and the user can create the list of friends by connecting with the other users associated with the desired classes. According to a fourth method, the virtual interaction system can keep a list of people that have been previously selected by the user to share the video with. Thus, the first user (200) can create a list of friends according to one or more of the methods described above, and finally watch the video with friends selected from the list of friends. Accordingly, the first user (200) can watch the live video with a second user (202) (e.g., friend) by synchronizing the timing of the live video between the first user and the second user to ensure that they are watching the same frame of the video at the same time.

In some embodiments, each user can control the video playback. For example, the first user (200) may want to pause the video during playback. Thus, if the first user (200) pauses the video, the video playback for both the first user (200) and the second user (202) will be paused on their client computer terminals. When it is desired to resume playback of the video, either users can start (e.g., un-pause) the video again and the video will begin to play on both users' client computer terminals. Alternatively, the system can be configured such that just one of the users can control the video playback. By way of example and not of limitation, the first user (200) can play and/or pause the video, while the second user (202) can watch the video without having the ability to control the playback.

Such users' reactions can be streamed as data from the first user (200) to the second user (202) or vice versa, either directly over the network (208) between the two users' computers (e.g., peer-to-peer) (210), or it can be routed through the central server of the virtual interaction system (206). In order to ensure that, for example, the first user's (200) commentary to the video can be seen or heard by the second user (202) with respect to the same video frame in which the first user (200) actually reacted, a timecode can be associated with the video to maintain a timing correspondence between the data and the video. In other words, if the first user cheers because his team scored a goal, the timecode ensures that the second user hears and/or sees the first user's cheer when the first user's team actually scored the goal. The data comprising the user's commentary can be mixed with the video and the timecode either at the central server (206) or it can be mixed at the user's client computer terminals.

Figure 3:
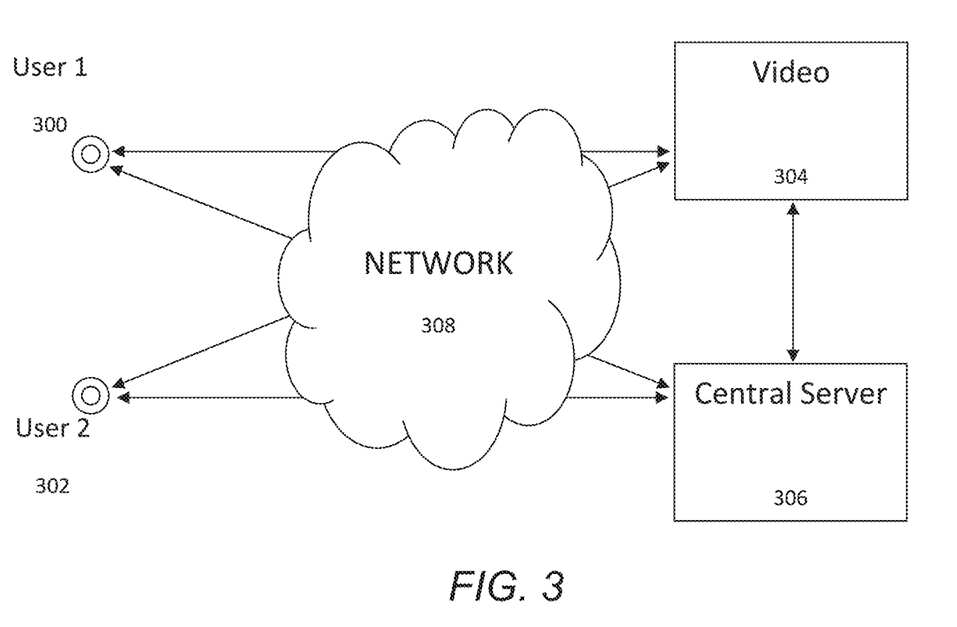
FIG. 3 shows an example block diagram of a virtual interaction system in an asynchronous mode.

In some embodiments, the virtual interaction system can operate in an asynchronous mode. FIG. 3 shows an example system configured to operate in such asynchronous mode where two or more users can virtually interact with each other while watching an online media at different times. An example situation can be when a group of friends get together to watch a movie, and another friend is unable to join this group of friends to watch the movie together. In such situation, the group of friends can watch the movie, while their reactions (e.g., comments while watching the movie, laughing, etc.) to watching the movie can be recorded on the central server (306) of the virtual interaction system. Similarly to the synchronous mode as described earlier, the central server (306) can associate a timecode with the video with the recorded reactions from the group of friends.

The asynchronous system can be setup in a similar manner as in the synchronous system using the same or similar accessories such as a webcam, speakers, microphone, or haptic sensors. However, differently from the synchronous mode, in the asynchronous mode, the commentary of the users can be recorded in a memory or database on the central server (306) of the virtual interaction system. Therefore, when a first user (300) (e.g., the group of friends gathering to watch the movie) watches the video (304), the webcam and microphone can be configured to record the first user's commentary to the video, and stored on the central server (306). When a second user (302) (e.g., the person that was unable to join his group of friends to watch the movie) watches the same video (304) by way of the virtual interaction system of the present disclosure, the second user (302) can watch and listen to the first user's (300) commentary by streaming the video together with the recorded audio/video from the first user (300), or any other friends that have previously watched the same video and recorded their commentary.

Figure 6:
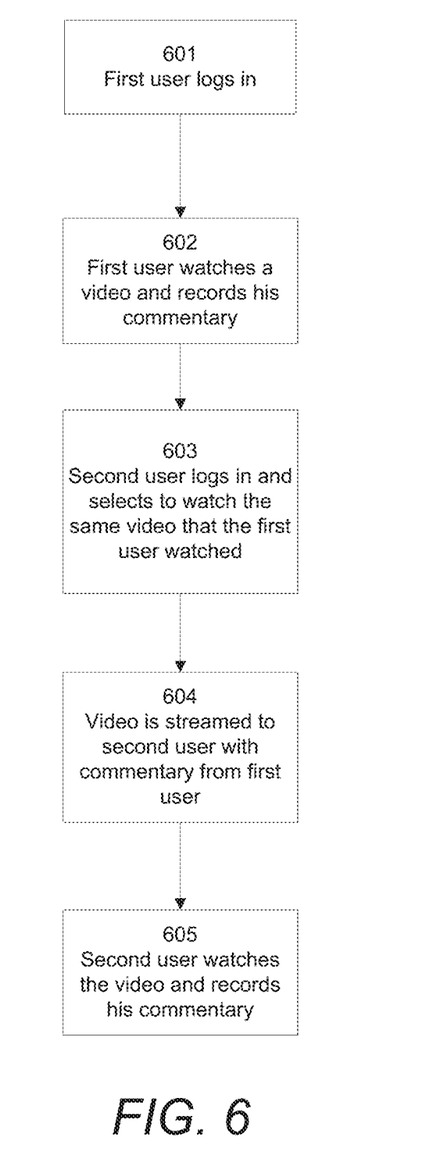
FIG. 6 shows a flow chart of the virtual interaction system operating in an asynchronous mode.

FIG. 6 shows an example procedure of the virtual interaction system operating in the asynchronous mode. According to a first step, the first user logs in (601) to the virtual interaction system via an interface. By using the virtual interaction system, the first user watches a video and records his commentary (602). Then, at a later moment (e.g., anytime that is not the same time as the first user) a second user that desires to watch the same video that the first user has watched, can login to the virtual interaction system (603). The video is streamed to the second user and the second user can choose to listen to the commentary of the first user (604). The second user can also record his commentary (605) for subsequent users.

In some embodiments, the virtual interaction system can operate as a combination of synchronous and asynchronous modes. For example, a plurality of users can virtually interact while watching an online media at the same time in the synchronous mode, and those users' commentaries can be recorded on the central server. Then, at a different time (e.g., later, next day, next week) one or more users can watch the same online media and replay the recorded commentaries stored on the central server in the asynchronous mode.

Figure 4:
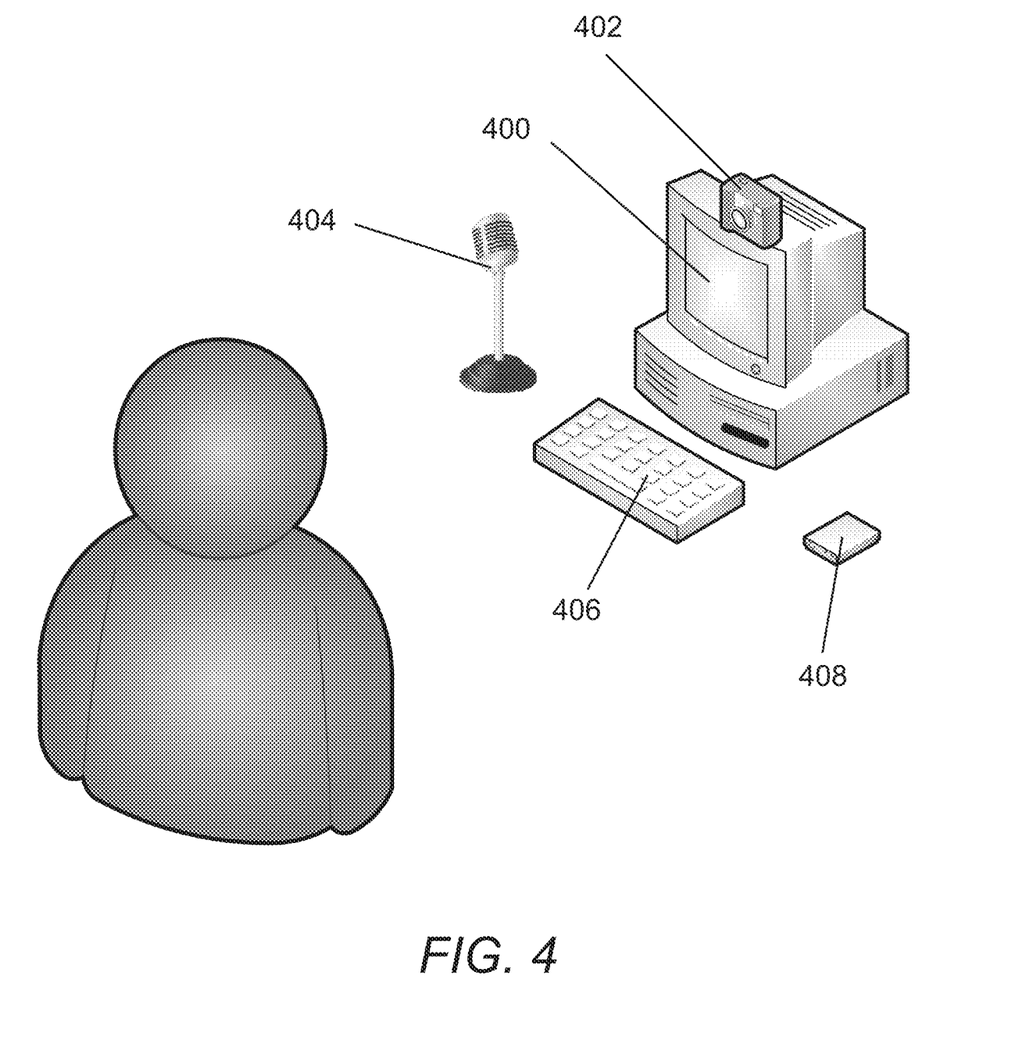
FIG. 4 shows an example hardware configuration of a user's end of the virtual interaction system.

FIG. 4 shows an example system where the users can configure their computer (400) to have accessories such as a webcam (402), speakers (408), microphone (404), or haptic sensors to convey their reactions and/or emotions to the other users while watching the video. For example, as the first user watches the video and thinks it's funny, the first user might laugh. The webcam (402) and the microphone (404) can be configured to capture the first user's laugh both visually and audibly. The second user can have speakers (408) configured to hear the first person's commentary (e.g., laugh) and view the commentary in real-time over a network, thereby allowing the users to virtually interact with each other while watching the video, even though they may physically be in different locations.

In some embodiments, a virtual interaction system can be implemented in a computer readable media located on a central server. Such computer readable media can be a hard drive, solid state drive, memory, optical disks such as CD-ROM or DVD based storage, magneto-optical storage, or any other type of data storage media. The central server for the virtual interaction system can include one or more central processing units (CPUs) to control the overall operation. The virtual interaction system can communicate with social network websites through a network, such as a wide area network (WAN) and/or a local area network (LAN). The client computers used by the users with the virtual interaction system can be, for example, a personal computer (PC), a mobile device, workstation, smartphone, etc. The person skilled in the art would appreciate that variations and/or combinations of different types of computers and servers can be used.

In some embodiments, the virtual interaction system can stream videos from a third party (e.g., YOUTUBE®) website. On the other hand, each user's commentary is stored on the central server and associated with a timecode so that the commentary matches the correct timing of the streaming video on the third party website. The matching of the commentary with the streaming of the video can take place at each of the users' client computers. The streaming of the videos can also comprise caching so that network delays do not cause one stream to fall behind another stream of video.

In some embodiments, commentaries from each user can be rated by other users so that when the users select which commentaries they want to listen to, they can select to listen to commentaries according to their rankings. In other words, for example, if a user is watching a soccer game and 100 commentaries are available from the various users, the user can choose to listen to commentaries from only the five-star rated users. According to another embodiment, a personalized algorithm can be generated by the virtual interaction system in order to automatically select the commentaries that are most likely to be appealing to the user. Such algorithm can be generated according to the user's history of videos and commentaries watched and/or listened to.

In some embodiments, users can visit an interstitial to pick up an iFrame and the virtual interaction system can be implemented using an iFrame layer to track status of the video player, and use that information to keep audio playback synchronized. This can be made automated by plug-in/extension. The person skilled in the art would appreciate that other types of frames can be implemented inside a browser instead of an iFrame. Accordingly, a plurality of frames can be arranged within the browser such that one frame can display, for example, a YOUTUBE® video, whereas another frame can display a video of another user.

In some embodiments, the virtual interaction system can be implemented in a social media application (e.g., FACEBOOK®) where the streaming videos are videos posted by the plurality of social media users. Links from updates and posts can be viewed in the iFrame layer in the user's browser, while the virtual interaction system records their commentary.

In some embodiments, the virtual interaction system can be implemented by multiplexing user commentaries on the central server to minimize bandwidth usage. For example, when commentaries from multiple users for a particular video are stored on the central server, the commentary from each of the users may be multiplexed on the central server. In this way, when other users want to hear such commentaries, a single multiplexed commentary can be sent to the user's client computer terminal instead of multiple individual commentaries being sent to the client computer terminals. In some embodiments, the users can selectively choose which commentary to view/listen to, and which commentary to ignore. By way of example and not of limitation, a user may desire to see his friend's reactions and clearly hear his commentary, while he may be interested in hearing the commentary from others as a background noise.

Figure 1:
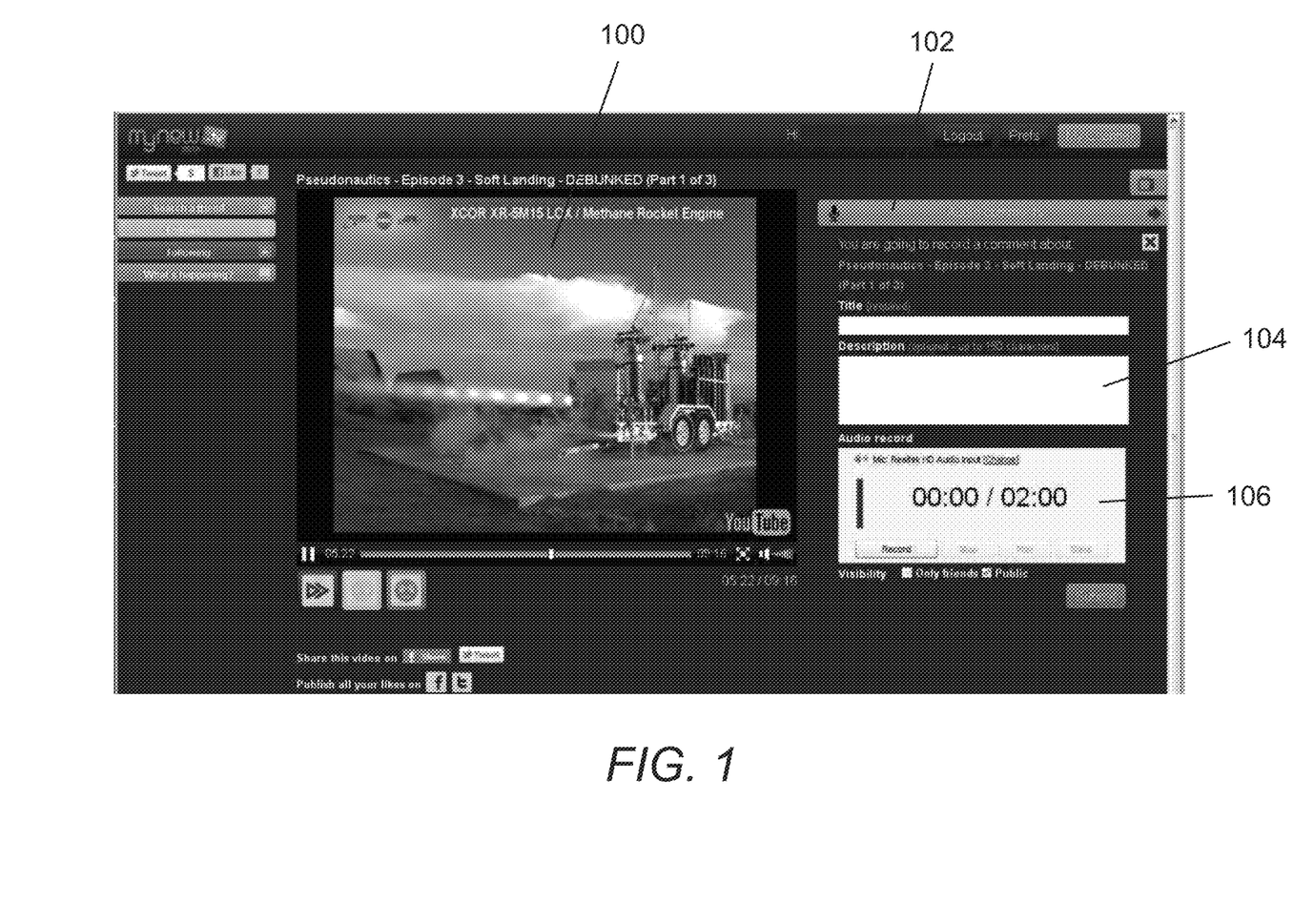
FIG. 1 shows a screenshot of an example video that can be viewed by a user.

In some embodiments, the virtual interaction system can have a user interface that can be displayed on a user's computer display to facilitate navigating the virtual interaction system. An example user interface is shown in FIG. 1 where a streaming video (100) from a third party website is being displayed. A section on the right side of the display shows a commentary section (102) where the user can select which other user's commentary to display or listen to. If the user desires to record his commentary, the user can start recording an audio or video commentary by selecting the appropriate icons in the record section (106) or type a description in the description box (104). Checkboxes can be used to allow the user to select different categories of audio. Pop out tabs and menus can be implemented to provide further navigation and control within the user interface. Horizontal bars can be implemented to show ratings of each video clip and/or category.

In some embodiments, the user interface can be configured to be triggered by an audio or video from a commentary, such that when triggered, the interface can be configured to display a second window or a picture-in-picture that show the video of the user commentary. Then when the commentary ends, the second window or the picture-in-picture can disappear.

Figure 7:
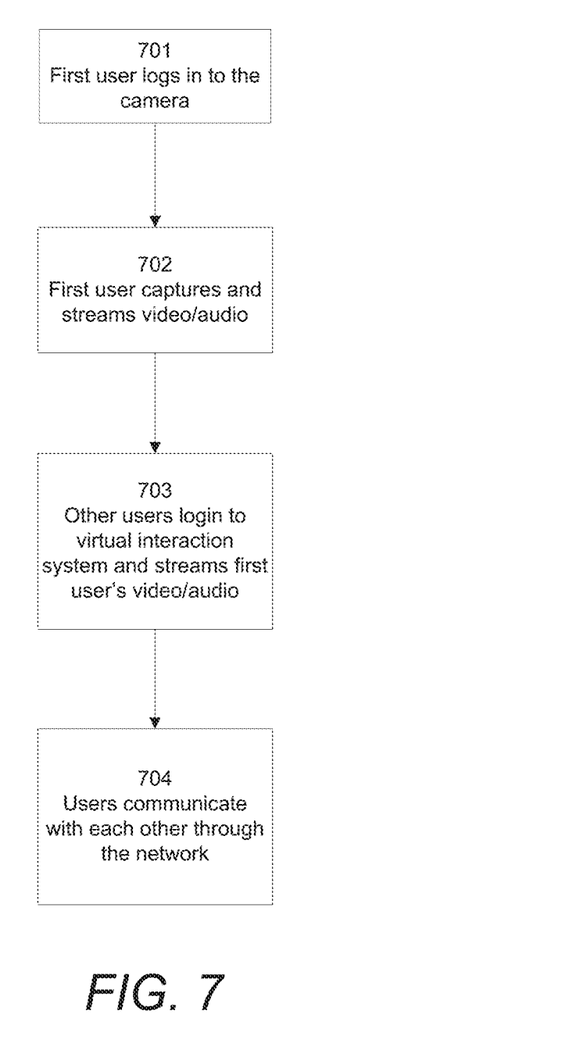
FIG. 7 shows a flow chart of the virtual interaction system operating with a portable camera.

In some embodiments, a user can wear a wearable camera (e.g., GOPRO®) having a network connection (e.g., Internet) on his body to capture actions from his daily activities. A computer or a smartphone can also be connected to the network and configured to view what is being captured by the wearable camera. By way of example and not of limitation, FIG. 7 shows a first user logging into his user account on the wearable camera (701). The camera can capture video and/or audio, and begin streaming (702) the captured video and/or audio in real time to the network. Other users can login using a computer or a smartphone to view the content that is being streamed by the first user (703). Moreover, a plurality of users can communicate with each other and/or leave a commentary (704) as described in earlier sections of the present disclosure. Although in some existing applications (e.g., SKYPE®), two or more users can connect to each other to conduct video conversations, the two or more users use computers to conduct the video conversations, and the users choose to specifically connect to each other. In other existing applications (e.g., sex chat rooms), users can stream their video from their computer and have multiple users connect with each other to view the video and interact with text. Other existing applications (e.g., social networks) allow users to share text or offline media (e.g., media that is not real-time) with specific users (e.g., "friends", "subscribers" or "followers"). The embodiments of present disclosure allows a user to wear an Internet- or network-connected camera to allow a subset of users (e.g., his/her friends) to connect to the camera's stream, as well as provide audio feedback/commentary, visual or other forms of data, such as pointing to a webpage. By way of example and not of limitation, pointing to a webpage can provide relevant information to be displayed in a retinal display or a goggle.

The examples set forth above are provided to give those of ordinary skill in the art a complete disclosure and description of how to make and use the embodiments of the present disclosure, and are not intended to limit the scope of what the inventors regard as their disclosure. Modifications of the above-described modes for carrying out the disclosure may be used by persons of skill in the art, and are intended to be within the scope of the following claims. All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a", "an", and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

The invention claimed is:

1. A system for social media interaction, the system comprising:
a server configured to:
a) provide a first video media to a first user through a network;
b) retrieve and store a second video media from the first user, the second video media being commentary on the first video media;
c) multiplex the first video media with the second video media into a multiplexed video media;
d) provide the multiplexed video media to a second user through the network; and
e) retrieve and store a third video media from the second user, the second video media being commentary on the multiplexed video media.

2. The system of claim 1, wherein the server is further configured to allow the second user to assign weights to the audio portions of the multiplexed video.

3. The system of claim 1, wherein the server is further configured to associate timecodes from the first video media with the second and third video media.

4. The system of claim 1, wherein the first video media and second video media are displayed in separate user interface windows to the second user.

\* \* \* \* \*

UNITED STATES PATENT AND TRADEMARK OFFICE
CERTIFICATE OF CORRECTION

PATENT NO. : 10,644,894 B2
APPLICATION NO. : 15/792645
DATED : May 5, 2020
INVENTOR(S) : Alejandro Backer Page 1 of 1

It is certified that error appears in the above-identified patent and that said Letters Patent is hereby corrected as shown below:

In the Claims

In Column 10, Line 28, for Claim 1 replace 'the second video media' with --the third video media--

Signed and Sealed this
Fifth Day of January, 2021

Andrei Iancu
*Director of the United States Patent and Trademark Office*